(12) United States Patent
Collins

(10) Patent No.: US 6,253,473 B1
(45) Date of Patent: Jul. 3, 2001

(54) HOLDER FOR CALENDAR DISPLAY

(76) Inventor: Todd A. Collins, 3819 Abbey Ct., Newbury Park, CA (US) 91320

( * ) Notice: Subject to any disclaimer, the term of this patent is extended or adjusted under 35 U.S.C. 154(b) by 0 days.

(21) Appl. No.: 09/375,206

(22) Filed: Aug. 16, 1999

(51) Int. Cl.[7] .............................. B42D 5/04; G09D 3/02
(52) U.S. Cl. .................................................. 40/120; 283/3
(58) Field of Search ........................ 283/2, 3, 4; 40/107, 40/120, 122, 726, 736, 779, 781

(56) References Cited

U.S. PATENT DOCUMENTS 398,953 * 3/1889 East .......................................... 40/735
1,712,302 * 5/1929 Harris ...................................... 40/120

* cited by examiner

Primary Examiner—C. Davis
(74) Attorney, Agent, or Firm—Allan M. Shapiro

(57) ABSTRACT

The calendar of the normally folded type is displayed in an unfolded position on a backboard upon which is pivoted a frame. The frame has upper and lower openings defined by stiles and crosspieces. The back of the frame has a recess sized to receive the calendar in its unfolded position. The openings in the frame permit viewing of the upper and lower calendar sheets when positioned therein. When the frame is closed against the backboard, the calendar is held in position with access to both the upper and lower calendar sheets. The frame is easily opened for adjusting of the calendar sheets.

9 Claims, 1 Drawing Sheet

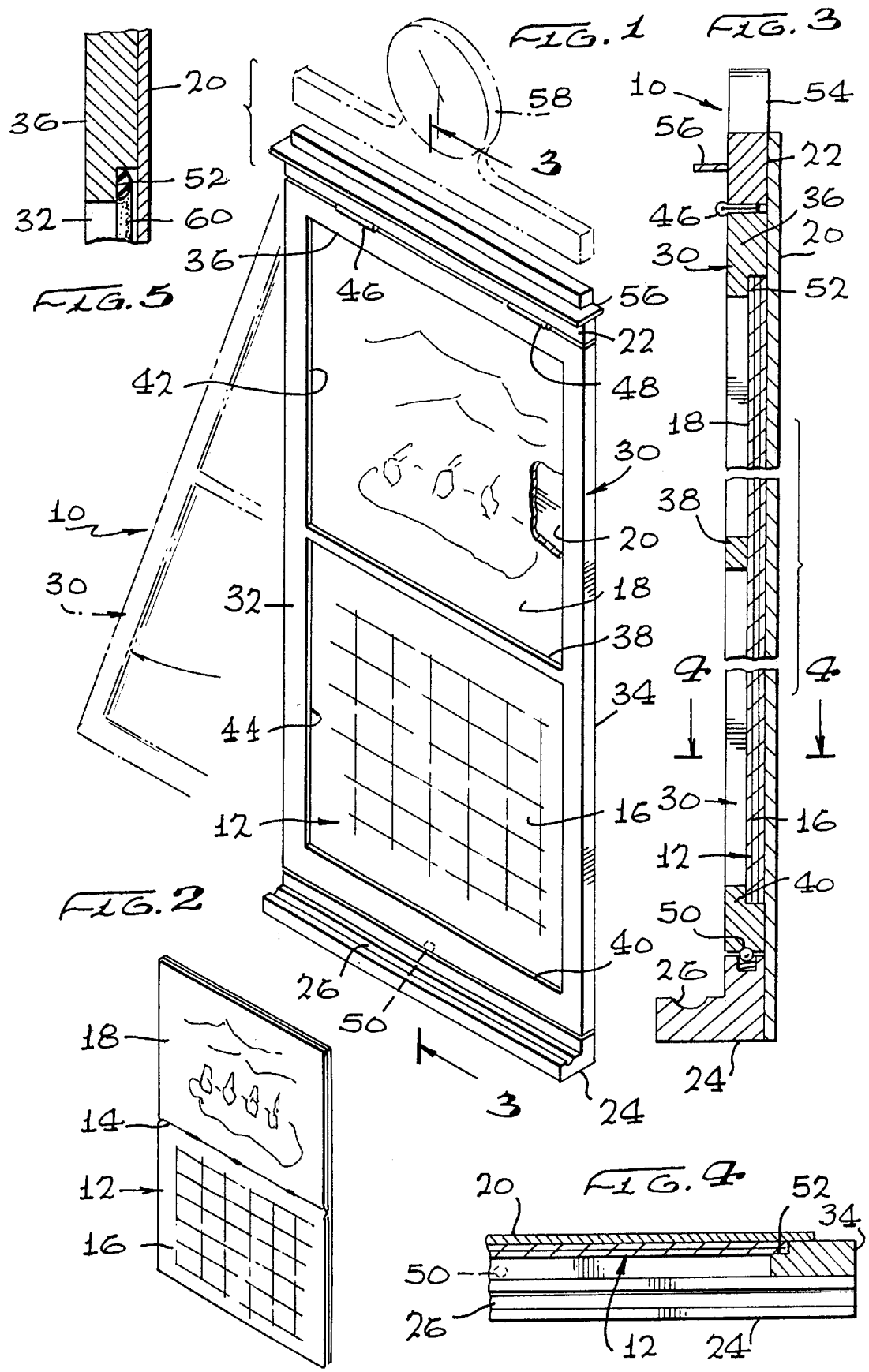

HOLDER FOR CALENDAR DISPLAY

FIELD OF THE INVENTION

This invention is directed to a holding structure which retains a calendar in position for display of both month and picture, permits access to the sheet which has the calendar printed thereon and permits access to the calendar so that its page may be changed every month to maintain it in current condition.

BACKGROUND OF THE INVENTION

The most common calendar structure is the assembly of a plurality of pages which are stapled together along a center fold line. With the center fold line in a horizontal position, successive picture pages are positioned above the center line and successive calendar pages are positioned below the center line.

Conventionally, such calendars have a hole therethrough on the edge away from the center line. This hole permits hanging of the calendar on a suitable hanging projection, such as a nail or other similar projection. When supported in such a manner, the lower leaf can be raised and hung on the support, opening a new picture and new calendar month. Such a supporting structure is neither decorative nor secure. The calendar is unframed and thus presents an unfinished appearance. While the monthly calendar page is accessible, the fact that the entire calendar simply hangs from a single nail does not provide much security. Accordingly, there is a need for additional and more decorative support.

SUMMARY OF THE INVENTION

In order to aid in the understanding of this invention it can be said in essentially summary form that it is directed to a holder for a calendar for the support and display thereof. The holder comprises a backboard and a frame, including a calendar recess, with the frame being openable away from the backboard. When the frame is opened, the open calendar can be placed in the recess. When the frame is replaced, it holds the calendar in the recess. The frame is open in the front so that there is both visual and physical access to the front of the calendar as it lies open in the recess.

It is thus a purpose and advantage of this invention to provide a calendar display structure which accepts a calendar and holds it in place for viewing.

It is another purpose and advantage of this invention to provide a display structure for a calendar which displays both the picture and the calendar month sheet of the calendar, with at least the calendar month sheet exposed for physical access so that it may be marked upon.

It is another purpose and advantage of this invention to provide a calendar display structure which has an openable frame so that the frame can be opened, the calendar page turned and the frame thereupon closed to continue to support the calendar in an updated position.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a perspective view of the holder for calendar display, in accordance with this invention, showing the holder in the closed position and retaining a calendar therein.

FIG. 2 is a perspective view on a reduced scale of a type of calendar retained for display in the holder of FIG. 1.

FIG. 3 is an enlarged longitudinal section through the holder of FIG. 1, as seen generally along the line 3—3 of FIG. 1, with parts broken away and parts taken in section.

FIG. 4 is a section taken generally along the line 4—4 of FIG. 3.

FIG. 5 is an enlarged portion of the holder for calendar display at the upper rail of the frame of an additional preferred embodiment of the invention.

DESCRIPTION OF THE PREFERRED EMBODIMENTS

The holder of this invention for displaying a calendar is generally indicated at 10 in FIGS. 1 and 3. The holder 10 is configured and sized to retain a calendar 12 of conventional configuration, as seen in FIG. 2. The calendar 12 has a center line 14 which represents a fold upon which the multiple sheets of the calendar are folded and stapled. The exposed lower half sheet 16 has a monthly calendar display thereon and the upper half sheet 18 usually has a picture display thereon. The calendar 12 is retained in holder 10 in the open position shown in FIG. 2 and thus the top and bottom edges of the calendar, in display, are the top and bottom edges shown in FIG. 2 and the left and right edges are the left and right edges shown in FIG. 2. The result is an open rectangular calendar structure which is twice the height of the folded calendar.

Holder 10 has as its principal structural part a backboard 20 of rectangular configuration. The backboard may be of plywood, wafer board or filled synthetic polymer material. It carries top rail 22 secured thereto across its top, and bottom rail 24 secured thereto across its bottom. The bottom rail may have a groove 26 therein for pencils, crayons and the like. The top and bottom rails are permanently attached to the backboard and are parallel to each other.

Frame 30 is sized to lie against the front of backboard 20 between top and bottom rails 22 and 24. Frame 30 is comprised of left and right stiles 32 and 34 which are joined by top, center and bottom crosspieces 36, 38 and 40. The frame thus described leaves upper and lower openings 42 and 44. Frame 30 is hinged underneath top rail 22 on hinges 46 and 48. The frame 30 can swing out at its bottom on these hinges to the dashed line position shown in FIG. 1. The frame is releasably retained in its closed position against backboard 20 by means of springloaded detent 50 which is mounted on bottom rail 24 and engages the bottom crosspiece 40 of the frame. Top and bottom crosspieces 36 and 40 as well as the left and right stiles 32 and 34 have a notch and shoulder which form a rear facing recess 52 therein, see the top of FIG. 3 and the right of FIG. 4. This recess is sufficiently deep in the front to back direction to receive the full thickness of the calendar 12. Its outer periphery is large enough to accept the calendar laterally and vertically within the recess. The frame openings 42 and 44 are smaller than the width of the calendar and, thus, the calendar is retained in the recess. Center crosspiece 38, see FIG. 3, is only as thick as to the front of the recess so that the calendar can pass behind the center crosspiece 38 as seen in FIG. 3.

Frame 30 can be hinged forward to the dashed line position shown in FIG. 1 and the calendar (unfolded to the correct page) placed behind the frame within the recess in the top and bottom crosspieces and side stiles. The fold and staples at the center of the calendar are hidden behind the center crosspiece 38. The calendar can be held in place as the frame is closed. For example, in the final closing, the left or right hand of the user positions the calendar against the backboard by reaching through the opening 42 to press the calendar against the backboard while the other hand closes the frame. When finally closed to the position of FIG. 3, the detent 50 holds the frame in place and the recesses 52 around the calendar accept the calendar and restrain it from lateral movement. It is important to note that there is no glass in the frame 30 and, thus, the lower calendar page is accessible for marking. When the month expires, the frame can be opened, the month page is folded up, the calendar is held in position and the frame is closed to retain the calendar with its new faces exposed.

The upper part of the holder may have a finial 54, as shown at the top of FIG. 3. It may have a decorative shadow panel 56 as shown at the top of FIG. 1. Furthermore, it may optionally carry a clock 58, or other decorative or functional elements, as desired to enhance the appearance of the holder.

FIG. 5 shows the recess 52 in stile 32 and top crosspiece 36. It also shows a soft foam rubber or rubberlike pressure member 60. The resilient pressure member 60 presses against the edges of the front face of the calendar to hold it in place when the frame is closed. This is optional additional position security for the calendar and, when used, need be present only at selected portions of the front face.

This invention has been described in its presently contemplated best modes and embodiments and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A holder for a calendar comprising:

a substantially planar backboard;

a frame, said frame being configured to lie against said backboard in a first position and being movable away from said backboard to a second position, a recess in said frame sized to receive a foldable calendar in an unfolded position, said recess being accessible when said frame is in its second position so that a calendar may placed into said recess, said recess being closed when said frame is in its first position to retain a calendar in said recess, an opening in said frame to permit viewing of the calendar in said recess, a top rail secured to said backboard, and hinges connecting said frame to said top rail so that said frame can be moved from its first position wherein it lies against the backboard to its second position away from said backboard.

2. The holder of claim 1 wherein there is a bottom rail secured to said backboard and said frame lies adjacent said bottom rail when in its first position and there is a latch between said bottom rail and said frame to releasably hold said frame in its first position.

3. The holder of claim 2 wherein there is a center crosspiece across said frame to divide said opening in said frame into an upper opening and a lower opening.

4. A holder for a calendar comprising:

a backboard, said backboard having a substantially planar face;

a frame movable from a first position wherein said frame lies substantially against said face to a second position away from said face, said frame having a recess therein sized to receive a foldable calendar in an unfolded position, said frame having an opening therein so that substantially all of a calendar in said recess can be seen through said opening, said frame being defined by a left stile, a right stile, a top crosspiece, a center crosspiece and a bottom crosspiece secured together to define upper and lower openings, with said center crosspiece positioned substantially to cover the fold in an unfolded calendar assembly; and a structure interengaging said frame and said backboard to releasably hold said frame in its first position against said backboard and permit said frame to be moved to its second position to adjust the calendar, said structure interengaging said frame and said backboard including a top rail, said top crosspiece of said frame being hingedly attached to said top rail to permit hinged swinging of said frame from said first position adjacent said backboard to said second position away from said backboard.

5. The holder of claim 4 wherein there is a bottom rail secured to said backboard and said bottom rail is positioned adjacent said bottom crosspiece when said frame is in its first position.

6. The holder of claim 5 wherein there is a latch interengaging said bottom crosspiece and said bottom rail to releasably retain said frame in its first position.

7. The holder of claim 6 wherein said bottom rail extends forward from said frame and has a pencil groove therein for receiving a writing or marking instrument so that said instrument may be retained adjacent said calendar for marking said calendar through said opening.

8. A holder for a calendar comprising:

a backboard, said backboard having a substantially planar face;

a frame movable from a first position wherein said frame lies substantially against said face to a second position away from said face, said frame having a recess therein sized to receive a foldable calendar in an unfolded position, said frame having an opening therein so that substantially all of a calendar in said recess can be seen through said opening, said recess having a soft resilient clamp structure therein for resilient engagement on a calendar in said recess; and a structure interengaging said frame and said backboard to releasably hold said frame in its first position against said backboard and permit said frame to be moved to its second position to adjust the calendar.

9. The holder of claim 8 wherein said frame is made substantially of wood.

* * * * *